(12) United States Patent
Koo et al.

(10) Patent No.: US 10,657,046 B2
(45) Date of Patent: May 19, 2020

(54) DATA STORAGE DEVICE AND OPERATING METHOD THEREOF

(71) Applicant: SK hynix Inc., Gyeonggi-do (KR)

(72) Inventors: Duck Hoi Koo, Gyeonggi-do (KR); Yong Chul Kim, Gyeonggi-do (KR); Yong Tae Kim, Seoul (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 16/014,666

(22) Filed: Jun. 21, 2018

(65) Prior Publication Data

US 2019/0163625 A1 May 30, 2019

(30) Foreign Application Priority Data

Nov. 28, 2017 (KR) .................. 10-2017-0160847

(51) Int. Cl.
*G06F 12/00* (2006.01)
*G06F 12/02* (2006.01)
*G06F 3/06* (2006.01)
*G06F 12/06* (2006.01)
*G06F 11/07* (2006.01)
*G06F 11/14* (2006.01)

(52) U.S. Cl.
CPC ........ *G06F 12/0253* (2013.01); *G06F 3/0608* (2013.01); *G06F 3/0679* (2013.01); *G06F 11/07* (2013.01); *G06F 11/14* (2013.01); *G06F 12/0246* (2013.01); *G06F 12/0646* (2013.01); *G06F 2212/7201* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

2011/0072199 A1* 3/2011 Reiter .................. G06F 13/14
711/103
2017/0315741 A1* 11/2017 Hashimoto .......... G06F 3/0619

FOREIGN PATENT DOCUMENTS

KR 1020160132204 11/2016

\* cited by examiner

*Primary Examiner* — Francisco A Grullon
*Assistant Examiner* — Craig S Goldschmidt
(74) *Attorney, Agent, or Firm* — IP & T Group LLP

(57) ABSTRACT

A data storage device includes a nonvolatile memory device including memory block groups and map data blocks, each memory block group including a first page group storing data transmitted from a host device and a second page group storing address mapping information corresponding to the data; and a controller configured to determine whether the number of valid data stored in a first memory block group in which the second page group is damaged is equal to or smaller than a size of an available capacity of an open map data block which is being used, and control, when the number of the valid data is equal to or smaller than the available capacity, the nonvolatile memory device to store address mapping information corresponding to the valid data of the first memory block group, in the open map data block.

16 Claims, 8 Drawing Sheets

DATA STORAGE DEVICE AND OPERATING METHOD THEREOF

CROSS-REFERENCES TO RELATED APPLICATION

The present application claims priority under 35 U.S.C. § 119(a) to Korean patent application number 10-2017-0160847, filed on Nov. 28, 2017, which is incorporated herein by reference in its entirety.

BACKGROUND

1. Technical Field

Various embodiments generally relate to a semiconductor device and, more particularly, to a data storage device and an operating method thereof.

2. Related Art

Recently, the paradigm for the computer environment has been converted into ubiquitous computing so that computer systems can be used anytime and anywhere. Due to this fact, the use of portable electronic devices such as mobile phones, digital cameras, and notebook computers has rapidly increased. In general, such portable electronic devices use a data storage device which uses a memory device for storing data.

A data storage device using a memory device provides advantages in that, since there is no mechanical driving part, stability and durability are excellent, an information access speed is high and power consumption is small. Examples of data storage devices having such advantages include a universal serial bus (USB) memory device, memory cards having various interfaces, a universal flash storage (UFS) device, and a solid-state drive (SSD).

SUMMARY

Various embodiments of the disclosure of the present invention are directed to a data storage device with improved operation performance and an operating method thereof.

In accordance with various embodiments of a first aspect of the invention, a data storage device is provided. The data storage device may include: a nonvolatile memory device including a plurality of memory block groups and a plurality of map data blocks, each memory block group including a first page group in which data transmitted from a host device are stored and a second page group in which address mapping information corresponding to the data are stored; and a controller configured to, when a first memory block group in which the second page group is damaged occurs among the plurality of memory block groups, determine whether the number of valid data stored in the first memory block group is equal to or smaller than an available capacity of an open map data block which is being used among the plurality of map data blocks, and control, when the number of the valid data stored in the first memory block group is equal to or smaller than the available capacity of the open map data block, the nonvolatile memory device to store address mapping information corresponding to the valid data of the first memory block group, in the open map data block.

In accordance with various embodiments of a second aspect of the invention, a method for operating a data storage device is provided the method including a nonvolatile memory device, including a plurality of memory block groups each having a first page group in which data transmitted from a host device are stored and a second page group in which address mapping information corresponding to the data are stored and a plurality of map data blocks, and a controller for controlling the nonvolatile memory device, may include: comparing, when a first memory block group in which the second page group is damaged occurs among the plurality of memory block groups, the number of valid data stored in the first memory block group and an available capacity of an open map data block which is being used among the plurality of map data blocks, by the controller; and controlling, when the number of the valid data stored in the first memory block group is equal to or smaller than the available capacity of the open map data block, the nonvolatile memory device by the controller to store address mapping information corresponding to the valid data of the first memory block group, in the open map data block.

In accordance with various embodiments of a third aspect of the invention, a data storage device is provided. The data storage device may include: a memory device including first to third memory blocks; and a controller configured to control the memory device, when the first memory block is damaged, to move one or more physical-to-logical (P2L) address entries of the first memory block into the second memory block when the second memory block has available capacity equal to or greater than the size of the P2L address entries, and into the third memory block when the second memory block has available capacity less than the size of the P2L address entries.

In accordance with various embodiments of the invention, a predetermined number of P2L address entries may be stored in each map data block. The present invention may improve the garbage collection (GC) and may prevent its cost from increasing excessively.

Also, in accordance with various embodiments of the present invention P2L address entries for a plurality of super blocks may be stored in a map data block, thus improving the use efficiency of a limited number of map data blocks.

DETAILED DESCRIPTION

Hereinafter, a data storage device and an operating method thereof will be described below with reference to the accompanying drawings through various examples of embodiments of the present invention.

In describing the various embodiments of the present invention, detailed description of known related art may be omitted to avoid obscuring the disclosure of the invention with unnecessary known details.

Also, it is noted that terms such as first and second may be used to describe various components, however, the components are not limited by these terms, but rather the terms are used only for distinguishing similar components from each other.

It is further noted that, as used herein, singular forms are intended to include the plural forms as well, unless the context clearly indicates otherwise.

It will be further understood that the terms "includes", and "including" are used interchangeably with the open-ended terms "comprises", "comprising", to specify the presence of any stated elements and to not preclude the presence or addition of one or more other elements.

Also, as used herein, the term "and/or" includes any and all combinations of one or more of the associated listed items.

In the following description, numerous specific details are set forth in order to provide a thorough understanding of the present invention. The present invention may be practiced without some or all these specific details. In other instances, well-known process structures and/or processes have not been described in detail in order not to unnecessarily obscure the present invention.

Figure 1:
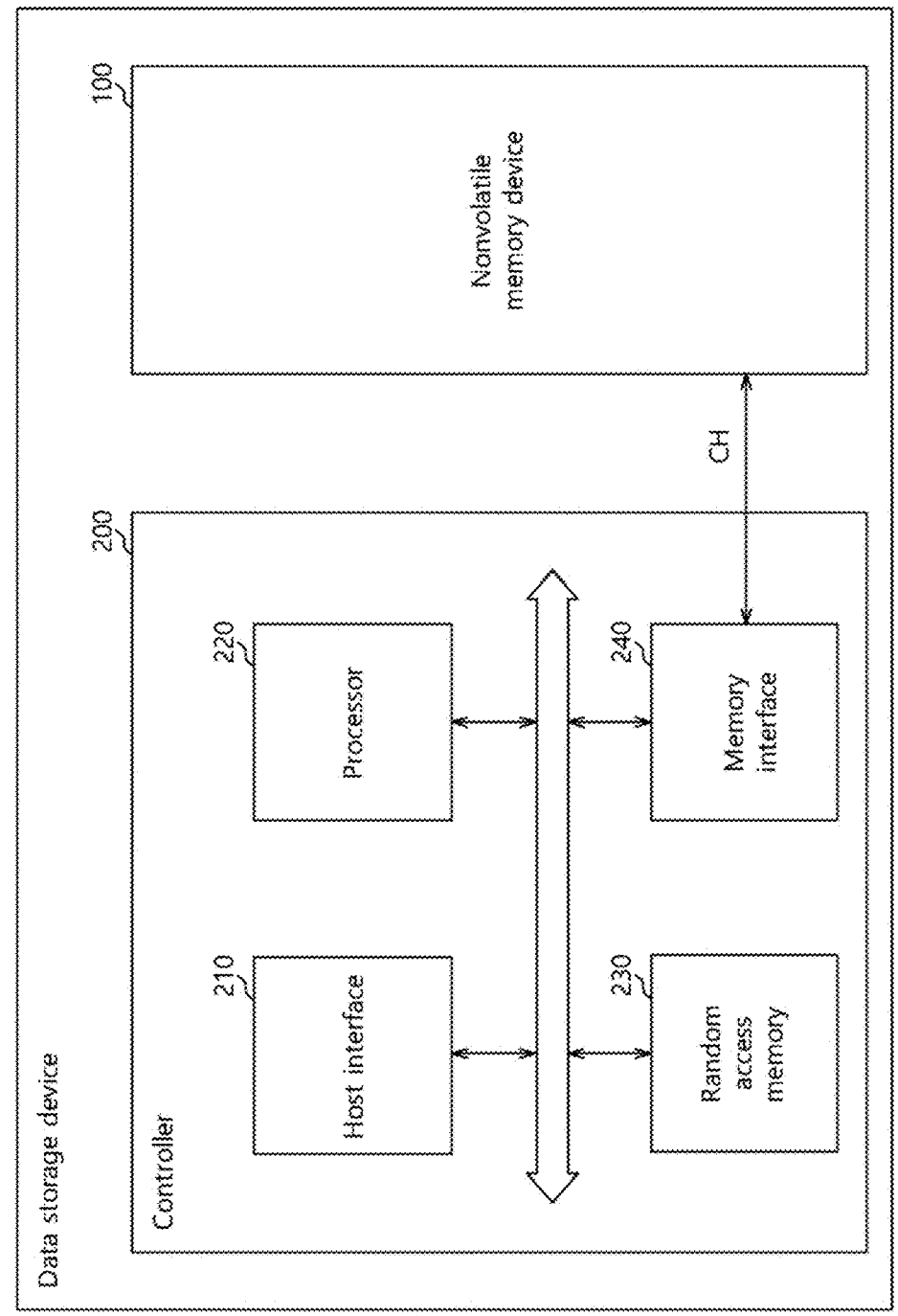
FIG. 1 is a block diagram illustrating a configuration of a data storage device in accordance with an embodiment of the present disclosure.

It is also noted, that in some instances, as would be apparent to those skilled in the relevant art, a feature or element described in connection with one embodiment may be used singly or in combination with other features or elements of another embodiment, unless otherwise specifically indicated FIG. 1 is a block diagram illustrating an example of the configuration of a data storage device 10 in accordance with an embodiment. In the present embodiment, the data storage device 10 may store data to be accessed by a host device (not shown) such as a mobile phone, an MP3 player, a laptop computer, a desktop computer, a game player, a TV, an in-vehicle infotainment system, and so forth. The data storage device 10 may also be referred to as a memory system. The data storage device 10 may be operatively coupled to the host via any suitable method.

The data storage device 10 may be manufactured as any one of various kinds of storage devices according to a host interface meaning a transmission protocol with respect to the host device. For example, the data storage device 10 may be configured as any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The data storage device 10 may be manufactured as any one among various kinds of package types. For example, the data storage device 10 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

Referring to FIG. 1, the data storage device 10 may include a nonvolatile memory device 100 and a controller 200.

The nonvolatile memory device 100 may operate as the storage medium of the data storage device 10. The nonvolatile memory device 100 may be configured by any one of various types of nonvolatile memory devices such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase change random-access memory (PRAM) using a chalcogenide alloy, and a resistive random-access memory (RERAM) using a transition metal compound, depending on memory cells.

The nonvolatile memory device 100 may include a memory cell array which has a plurality of memory cells respectively disposed at regions where a plurality of bit lines (not shown) and a plurality of word lines (not shown) intersect with each other. The memory cell array may include a plurality of memory blocks, and each of the plurality of memory blocks may include a plurality of pages.

For example, each memory cell of the memory cell array may be a single level cell (SLC) storing one bit, a multi-level cell (MLC) capable of storing 2-bit data, a triple level cell (TLC) capable of storing 3-bit data or a quadruple level cell (QLC) capable of storing 4-bit data. The memory cell array may include a plurality of memory cells from at least one of single level cells, multi-level cells, triple level cells and quadruple level cells. The memory cell array may include memory cells of a 2-dimensional horizontal structure or memory cells of a 3-dimensional vertical structure.

Figure 2:
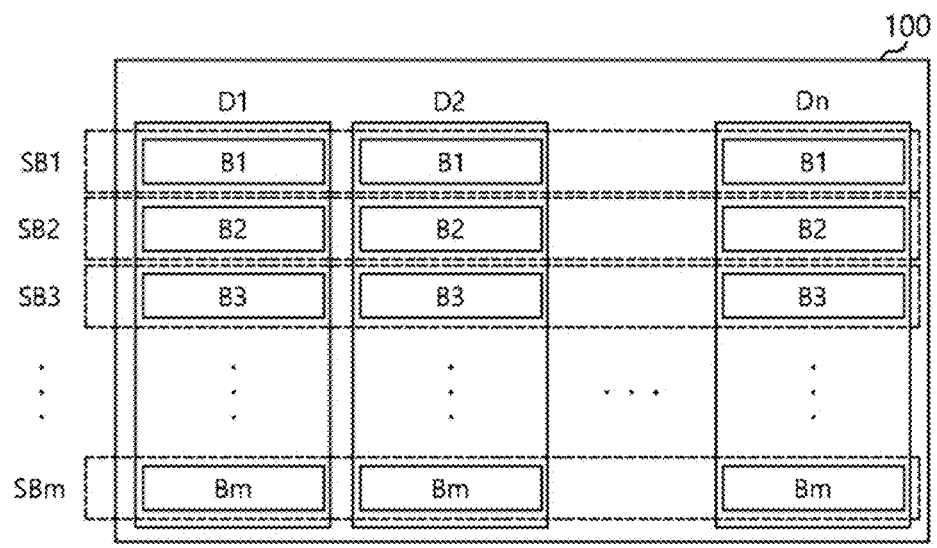
FIG. 2 is a diagram illustrating a configuration of a nonvolatile memory device in accordance with an embodiment of the present disclosure.

FIG. 2 is a diagram illustrating an example configuration of a nonvolatile memory device.

Referring to FIG. 2, the nonvolatile memory device 100 may include a plurality of dies D1 to Dn. Each of the dies D1 to Dn may include a plurality of memory blocks B1 to Bm. While not illustrated in FIG. 2, each of the dies D1 to Dn may include a plurality of planes, and each of the planes may include a plurality of memory blocks. In FIG. 2, planes are omitted for the sake of simplification in illustration.

As shown in FIG. 2, the nonvolatile memory device 100 may include a plurality of super blocks, that is, first to m^th super blocks SB1 to SBm. Each of the first to m^th super blocks SB1 to SBm may include a plurality of memory blocks. For example, the first super block SB1 may include the first memory blocks B1 of the first to n^th dies D1 to Dn. Similarly, the second super block SB2 may include the second memory blocks B2 of the first to n^th dies D1 to Dn, and so on and so forth the m^th super block SBm may include the m^th memory blocks Bm of the first to n^th dies D1 to Dn.

The controller 200 may include a host interface 210, a processor 220, a random-access memory 230 and a memory interface 240.

The host interface 210 may interface the host device (not shown) and the data storage device 10. For example, the host interface 210 may communicate with the host device 400 by using any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The processor 220 may be configured by a micro control unit (MCU) or a central processing unit (CPU). The processor 220 may process the requests transmitted from the host device. In order to process the requests, the processor 220 may drive an instruction or algorithm of a code type, that is, a software, loaded in the random-access memory 230, and may control internal function blocks and the nonvolatile memory device 100.

The random-access memory 230 may be configured by any suitable random-access memory including, for example, a dynamic random-access memory (DRAM) or a static random-access memory (SRAM). The random-access memory 230 may store a software to be driven by the processor 220. Further, the random-access memory 230 may store data necessary for driving of the software. Namely, the random-access memory 230 may operate as a working memory of the processor 220.

Figure 3:
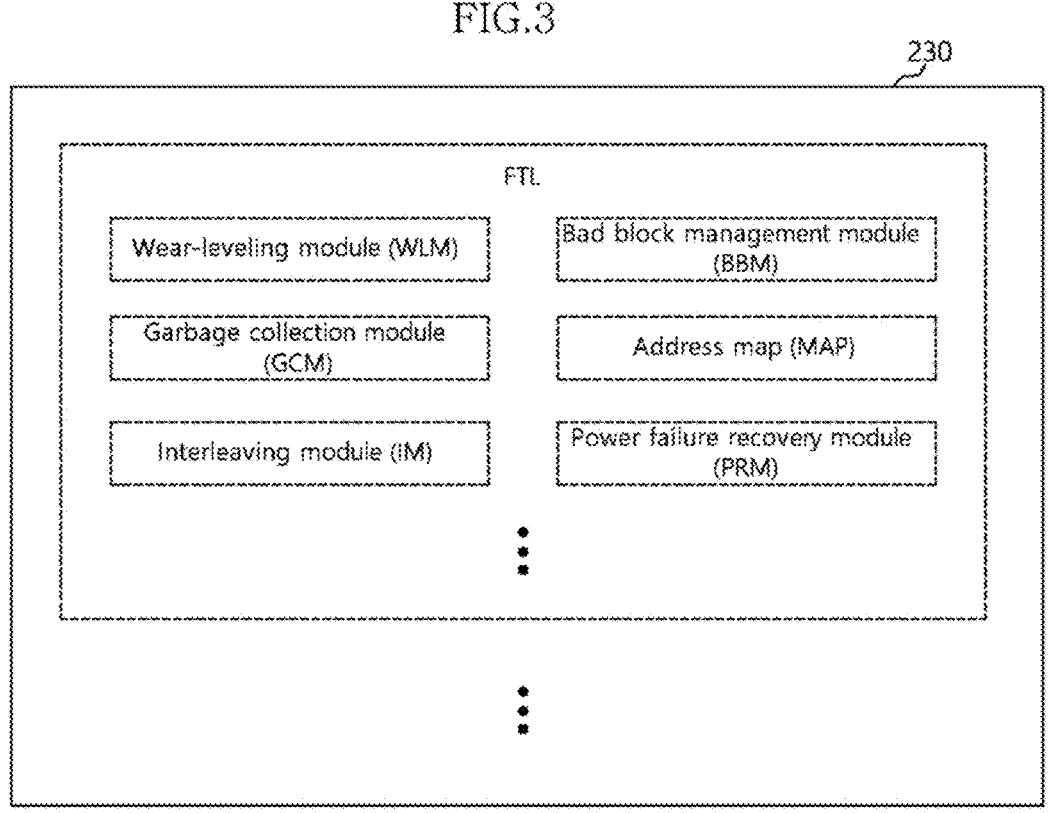
FIG. 3 is a diagram illustrating software driven in the data storage device in accordance with an embodiment of the present disclosure.

FIG. 3 is a diagram illustrating software stored in the random-access memory 230. The software may be driven by the processor 220.

In the case where the nonvolatile memory device 100 is a flash memory device, the software which is stored in the random-access memory 230 and is driven by the processor 220 is known as a flash translation layer FTL. The software may be driven by the processor 220 for controlling the intrinsic operations of the nonvolatile memory device 100 and provide device compatibility to the host device. Through driving of the software (e.g., an FTL in the case of a flash memory), the host device may recognize and use the data storage device 10 as a general data storage device such as a hard disk. The software, (e.g., the FTL) which is loaded in the random-access memory 230 may include a plurality of modules for performing various functions and metadata necessary for driving the modules.

Referring to FIG. 3, the software illustrated is an FTL. The FTL according to the embodiment of FIG. 3, may include a wear-leveling module WLM, a bad block management module BBM, a garbage collection module GCM, an address map MAP, an interleaving module IM and a power failure recovery module PRM. However, it is to be noted that the modules included in the FTL are not specifically limited thereto.

The wear-leveling module WLM may manage wear levels for the memory blocks of the nonvolatile memory device 100. The memory cells of the nonvolatile memory device 100 may wear out because of the repetitive erase and program operations. Worn-out memory cells may cause fails (for example, physical defects). The wear-leveling module WLM may manage the program-erase counts of respective memory blocks to be leveled so as to prevent a certain memory block from being worn out faster than the other memory blocks. That is, the wear-leveling module WLM may manage the wear levels of all the memory blocks included in the nonvolatile memory device 100 to retain similar levels.

The bad block management module BBM may manage a memory block in which a fail has occurred, among the memory blocks of the nonvolatile memory device 100. As described above, a fail (for example, a physical defect) may occur in a worn-out memory cell. The data stored in a failed memory cell may not be read normally. Moreover, data may not be stored normally in a failed memory cell. The bad block management module BBM may manage a memory block including a failed memory cell not to be used.

The garbage collection module GCM may manage the nonvolatile memory device 100 to perform an operation of collecting the valid data stored and distributed in the memory blocks of the nonvolatile memory device 100, to one memory block, and erasing invalid data.

The nonvolatile memory device 100 configured by a flash memory device does not support overwrite of data due to a structural characteristic thereof. If data is programmed again in a memory cell which is in a program state, the reliability of the data stored in the corresponding memory cell is not ensured. Therefore, in order to program data in a memory cell which is in a program state, an erase operation should be preceded.

Since an erase operation for the nonvolatile memory device 100 is performed by the unit of memory block, a substantially long time is required. Therefore, if a memory cell corresponding to an address to program is in a program state, instead of programming data after erasing the corresponding memory cell, the processor 220 programs data in another memory cell which is already in an erase state. In this case, the data stored in the memory cell to be originally programmed may be invalid data, and the data stored in another memory cell may be valid data.

Due to such an operation of the processor 220, valid data and invalid data are mixed in the nonvolatile memory device 100. If necessary, the processor 220 may perform a series of operations of collecting distributed valid data in one place, that is, one memory block, and erasing invalid data, by driving the garbage collection module GCM. Such a series of operations are referred to as a garbage collection operation.

The address map MAP may store pieces of address mapping information for an address translation operation. In the case where the host device accesses the data storage device 10 (for example, requests a read operation or a program operation), the host device may provide a logical address to the data storage device 10. The flash translation layer FTL using the address map MAP may translate the logical address into an actual address, that is, a physical address, of the nonvolatile memory device 100, and may perform a read operation or a program operation for memory cells corresponding to the translated physical address.

The interleaving module IM may manage a plurality of memory blocks included in one group in the nonvolatile memory device 100 to operate in parallel. As shown in FIG. 2, the nonvolatile memory device 100 may include the first to m^th super blocks SB1 to SBm. In order to increase a data processing amount, the processor 220 may drive the interleaving module IM and thereby simultaneously perform a program operation and a read operation for the plurality of memory blocks included in each of the first to m^th super blocks SB1 to SBm. In other words, by driving the interleaving module IM, the processor 220 may operate in parallel the memory blocks in each super block. For example, the processor 220 may operate in parallel the first memory blocks B1 included in the first super block SB1, or the second memory blocks B2 included in the second super block SB2 and so on and so forth the m^th memory blocks of the m^th super block SBm.

If power supplied to the data storage device 10 is suddenly cut off during a program operation for a memory cell, the program operation is not normally completed. When the data storage device 10 is recovered from an unexpected power failure (for example, a sudden power-off (SPO)), the processor 220 may manage a memory cell, a page or a memory block which has a high possibility of an error to occur due to the power failure, by using the power failure recovery module PRM.

The random-access memory 230 may operate as a data buffer memory or a data cache memory. For example, the random-access memory 230 may temporarily store data to be transmitted from the host device to the nonvolatile memory device 100 or from the nonvolatile memory device 100 to the host device.

The memory interface 240 may control the nonvolatile memory device 100 according to the control of the processor 220.

The memory interface 240 may also be referred to as a memory controller. The memory interface 240 may provide control signals to the nonvolatile memory device 100. The control signals may include a command, an address and so forth, for controlling the nonvolatile memory device 100. The memory interface 240 may provide data to the nonvolatile memory device 100 or may be provided with data from the nonvolatile memory device 100. The memory interface 240 may be coupled with the nonvolatile memory device 100 through a channel CH including one or more signal lines.

Figure 4:
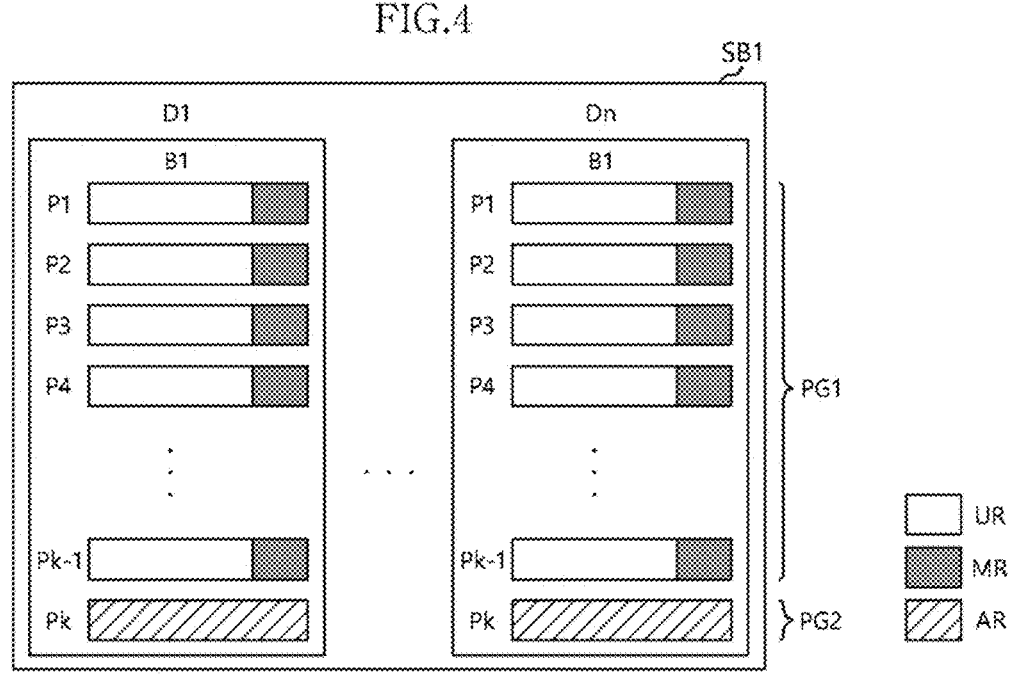
FIG. 4 is a diagram illustrating an example of a configuration of memory blocks included in one super block.

FIG. 4 is a diagram illustrating a configuration of memory blocks included in one super block. While FIG. 4 illustrates the first super block SB1 of FIG. 2 as an example, the memory blocks of the remaining super blocks may also have the same configuration as those shown in FIG. 4.

The first super block SB1 may include n number of first memory blocks B1 included in the first to n^th dies D1 to Dn. Each of the first memory blocks B1 may include k number of pages P1 to Pk. Here, n and k may be integers equal to or greater than 1. The first to k^th pages P1 to Pk may correspond to first to k^th word lines (not shown), respectively. Each of the first to k^th pages P1 to Pk may be one physical page and one or more logical pages.

The first to k^th pages P1 to Pk may be divided into a first page group PG1 and a second page group PG2. In FIG. 4, it is illustrated that the first page group PG1 includes the first to (k−1)^th pages P1 to Pk−1 and the second page group PG2 includes the k^th pages Pk. However, it is to be noted that the configuration of page groups is not limited specifically thereto.

Each of the first to (k−1)^th pages P1 to Pk−1 of the first page group PG1 may include a user region UR and a meta-region MR. The user region UR may be a region where the program data transmitted from the host device is stored. The meta-region MR may be a region where an information on the program data transmitted from the host device, an information on a program operation related with a program request, an information on a memory block to which the program operation is performed, and so forth are stored. An address mapping information on the program data stored in a corresponding page may be stored in the meta-region MR. For example, in the meta-region MR of each of the first to (k−1)^th pages P1 to Pk−1 of the first page group PG1, there may be stored a physical to logical (P2L) address entry for the program data stored in a corresponding page.

The P2L address entries stored in the meta-regions MR of the first to (k−1)^th pages P1 to Pk−1 may be stored in the k^th pages Pk of the second page group PG2. The k^th pages Pk of the second page group PG2 may be used as address regions AR where address mapping information (for example, P2L address entries) for the program data stored in the user regions UR of the first super block SB1 are stored.

If program operations are completed to the first to (k−1)^th pages P1 to Pk−1 of the first page group PG1 of the first super block SB1, the processor 220 may read out all the P2L address entries stored in the meta-regions MR of the first to (k−1)^th pages P1 to Pk−1 of the first page group PG1 and may store the read-out P2L address entries in the k^th pages Pk of the second page group PG2.

If a sudden power-off (SPO) occurs while the processor 220 stores, in the k^th pages Pk of the second page group PG2, the P2L address entries read out from the first page group PG1, the P2L address entries stored in the k^th pages Pk of the first super block SB1 may be damaged, and the k^th pages Pk of the first super block SB1 may not be used any more before performing an erase operation.

Each time a sudden power-off (SPO) occurs while sequentially performing program operations for the first to (k−1)^th pages P1 to Pk−1 of the first page group PG1 of the first super block SB1, the processor 220 detects an invalid page, generates at least one dummy page including the detected invalid page and continues a program operation from a page subsequent to the dummy page. For example, if a sudden power-off (SPO) occurs while performing a program operation for the (k−1)^th pages Pk−1 of the first super block SB1, the k^th pages Pk of the first super block SB1 become dummy pages and cannot be used as the address regions AR.

In this way, if a super block SB in which last pages (for example, k^th pages Pk) cannot be used as address regions AR occurs among the super blocks SB1 to SBm, the processor 220 may store the P2L address entries stored in the meta-regions MR of the first to (k−1)^th pages P1 to Pk−1 of the corresponding super block SB, in a system block (hereinafter, referred to as a 'map data block') allocated for storing map data.

Figure 5:
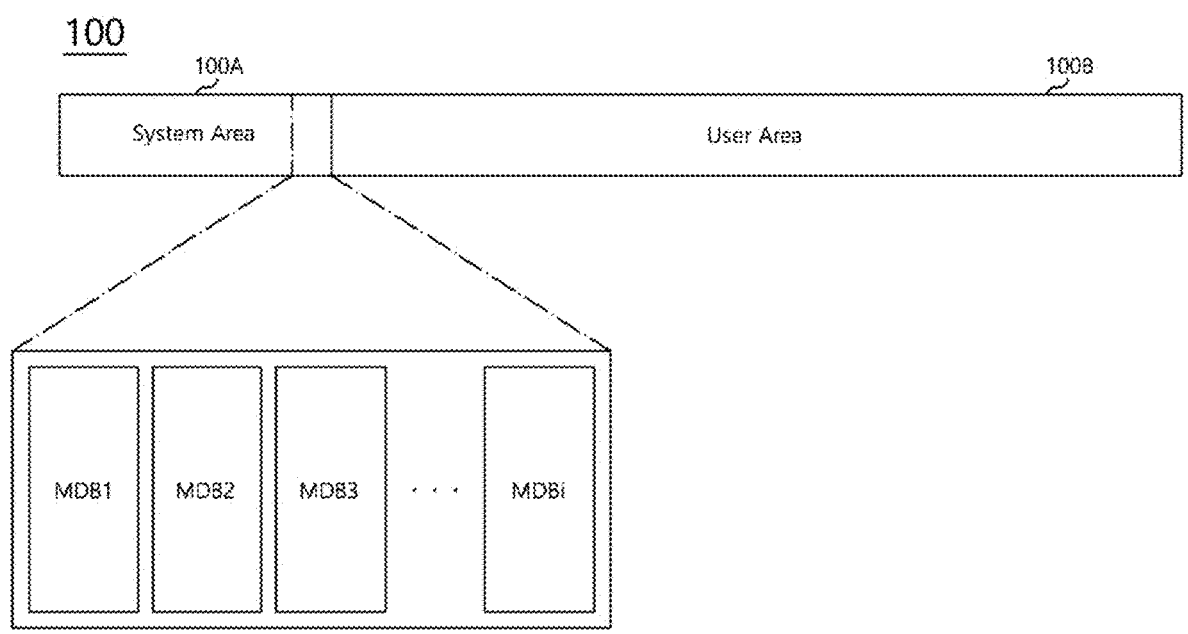
FIG. 5 is a diagram conceptually illustrating an example of area allocation of the nonvolatile memory device and map data blocks.

FIG. 5 is a diagram illustrating an area allocation of the nonvolatile memory device 100 and map data blocks. Referring to FIG. 5, the entire area of the nonvolatile memory device 100 may be allocated as a system area 100A and a user area 100B.

The system area 100A may store meta-information for managing the nonvolatile memory device 100, information on the characteristics of the nonvolatile memory device 100 or internal operations (for example, performance control, merge, wear-leveling, garbage collection, and so on) necessary for efficient management, a map table, and so forth. Although not shown specifically in FIG. 5, the system area 100A may include a plurality of memory blocks, and the memory blocks of the system area 100A may be managed by the unit of a single block. Single block may mean one physical block.

The user area 100B of the nonvolatile memory device 100 may store the program-requested data (program data) from the host device, or the like. Although not shown specifically in FIG. 5, the user area 100B may include a plurality of memory blocks, and the memory blocks of the user area 100B may be managed by the unit of a super block SB (i.e., a plurality of physical blocks) as shown in FIG. 2.

The system area 100A and the user area 100B of the nonvolatile memory device 100 may be allocated predetermined sizes. The controller 200 may transmit the size information of the user area 100B of the nonvolatile memory device 100 to the host device, and, without a limiting sense, the host device may set the length of logical addresses to be transmitted to the data storage device 10, based on the transmitted size information of the user area 100B. The length of logical addresses may correspond to the number of logical addresses.

A predetermined number among the memory blocks may be allocated to be map data blocks included in the system area 100A of the nonvolatile memory device 100. FIG. 5 illustrates an example in which i number of map data blocks MDB1 to MDB*i* are allocated. Here, 'i' may be an integer equal to or greater than 1. Each of the first to i^th map data blocks MDB1 to MDB*i* may store P2L address entries for one or more super blocks.

The maximum number of P2L address entries that can be stored in each of the first to i^th map data blocks MDB1 to MDB*i* may be set in advance. In general, since there is a P2L address entry corresponding to each valid data, the number of P2L address entries for a super block SB may correspond to the number of the valid data stored in that super block SB. Namely, in the present embodiment, the number of valid data for a super block SB is the same as the number of P2L address entries for that super block SB. The P2L address entries stored in the first to i^th map data blocks MDB1 to MDB*i* may be erased by an erase operation after garbage collection (GC) for one or more related super blocks SB is performed.

As described above, garbage collection (GC) refers to collecting the valid data distributed in a plurality of memory blocks to one memory block and performing an erase operation for memory blocks in which only invalid data are left. The larger that the number of valid data to be collected into one memory block is, the higher the garbage collection (GC) cost becomes. Increase in the cost of garbage collection (GC) means that a time required for performing garbage collection (GC) increases. If a time required for performing garbage collection (GC) increases, the operation performance of the data storage device 10 may degrade.

If P2L address entries are stored in one map data block without a limit in the number thereof, the utilization of the map data block increases, but the cost of garbage collection (GC) for the super blocks related with the P2L address entries stored in the single map data block increases. If P2L address entries for only one super block are stored in one map data block, the cost of garbage collection (GC) decreases, but the utilization of the map data block decreases.

In consideration of this, in the present embodiment, the maximum number of P2L address entries to be stored in one map data block is set in advance, and the P2L address entries of one or more super blocks are stored such that the maximum number of P2L address entries set for each map data block is not exceeded.

Figure 6:
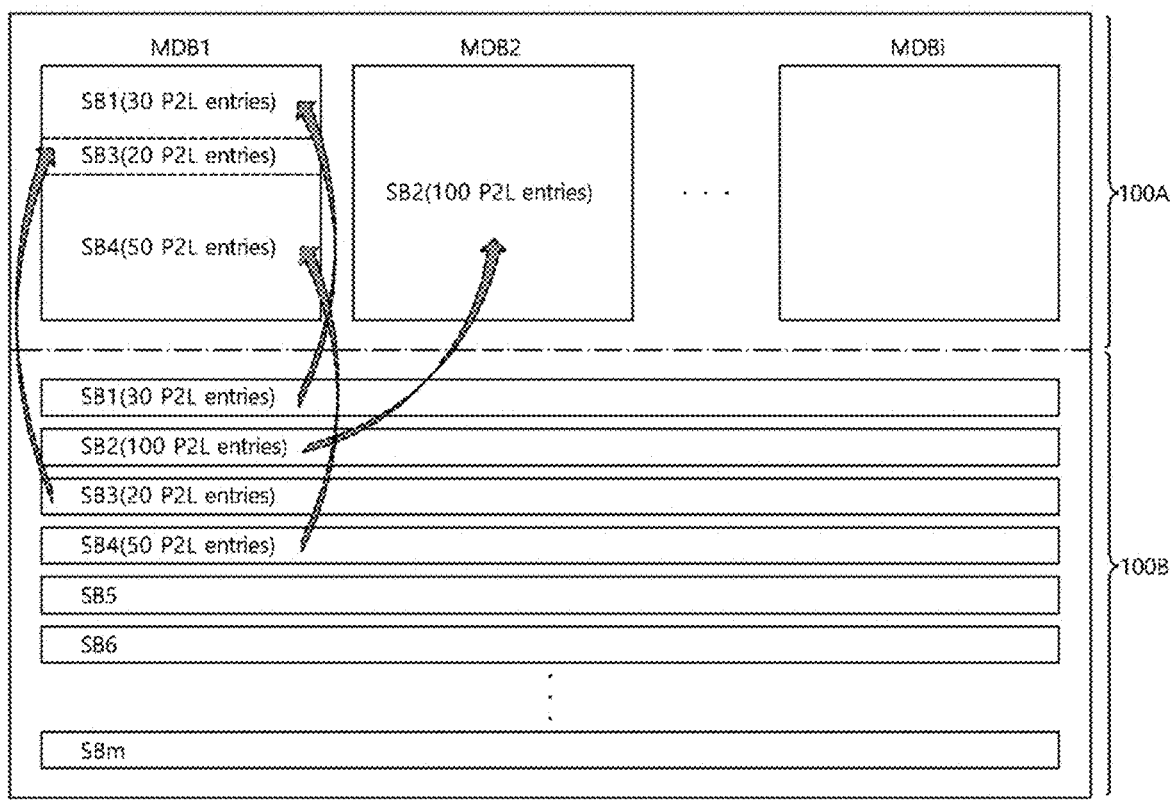
FIG. 6 is a diagram to assist in the explanation of storage of P2L entries of super blocks depending on the numbers thereof.

FIG. 6 is a diagram to assist in the explanation of storage of the P2L address entries of super blocks depending on the numbers of the P2L address entries corresponding to the respective super blocks. For the sake of convenience in explanation, in FIG. 6, it is assumed that the address regions AR (see FIG. 4) of the first to fourth super blocks SB1 to SB4 are damaged. Also, it is assumed that the numbers of the P2L address entries stored in the meta-regions MR of the first to fourth super blocks SB1 to SB4 are 30, 100, 20 and 50, respectively. Moreover, it is assumed that the maximum number of P2L address entries that can be stored in each of the first to i^th map data blocks MDB1 to MDB*i* is set to 100.

Hereinafter, a map data block in use is referred to as an 'open map data block,' and a map data block before use is referred to as a 'free map data block.'

The processor 220 checks the number of the valid data of the first super block SB1. Since there is a piece of address mapping information (i.e., a P2L address entry) corresponding valid data, the processor 220 may determine the number of the valid data of the first super block SB1 based on the number of the P2L address entries stored in the meta-regions MR of the first page group PG1 (see FIG. 4) of the first super block SB1.

The processor 220 may control the nonvolatile memory device 100 to read out P2L address entries from the meta-regions MR of the first super block SB1 and store the read-out P2L address entries for the first super block SB1 in the first map data block MDB1 of the system area 100A. Since the technology of reading out data from an arbitrary memory block and storing the read-out data in another memory block corresponds to a technology already know in the art, a detailed description will be omitted herein. As the P2L address entries for the first super block SB1 are stored, the first map data block MDB1 may become an open map data block.

If the first map data block MDB1 is full of the P2L address entries, the first super block SB1 may become a closed block. A closed block may mean a completely used block, for example, a block in which program for all pages is completed.

Since the number of the P2L address entries read out from the first super block SB1 is 30, the available capacity of the first map data block MDB1 may be 70 P2L address entries after the storage of the 30 number of P2L address entries.

The processor 220 determines the number of the valid data of the second super block SB2 based on the number of the P2L address entries stored in the meta-regions MR of the second super block SB2. The processor 220 may compare the number of the valid data of the second super block SB2 and the available capacity of the first map data block MDB1, and may determine whether or not the number of the valid data of the second super block SB2 is smaller than the available capacity of the first map data block MDB1.

Since the number of the valid data (i.e., the number of the P2L address entries) of the second super block SB2 is 100, it is larger than the currently available capacity (i.e., 70 number of P2L address entries) of the first map data block MDB1. Therefore, the processor 220 may control the nonvolatile memory device 100 to store the P2L address entries for the second super block SB2 in the second map data block MDB2 selected among free map data blocks.

The processor 220 determines the number of the valid data of the third super block SB3 based on the number of the P2L address entries stored in the meta-regions MR of the third super block SB3. The processor 220 may compare the number of the valid data of the third super block SB3 and the available capacity of the first map data block MDB1, and may determine whether or not the number of the valid data of the third super block SB3 is smaller than the available capacity of the first map data block MDB1.

Since the number of the valid data (i.e., the number of the P2L address entries) of the third super block SB3 is 20, it is smaller than the currently available capacity (i.e., 70 number of P2L address entries) of the first map data block MDB1. Therefore, the processor 220 may control the nonvolatile memory device 100 to store the P2L address entries for the third super block SB3 in the first map data block MDB1. Accordingly, the available capacity of the first map data block MDB1 may be 50 P2L address entries after the storage of the number of P2L address entries.

The processor 220 determines the number of the valid data of the fourth super block SB4 based on the number of the P2L address entries stored in the meta-regions MR of the fourth super block SB4. The processor 220 may compare the number of the valid data of the fourth super block SB4 and the available capacity of the first map data block MDB1, and may determine whether or not the number of the valid data of the fourth super block SB4 is smaller than the available capacity of the first map data block MDB1.

Since the number of the valid data (i.e., the number of the P2L address entries) of the fourth super block SB4 is 50, it is equal to the currently available capacity (i.e., 50 number of P2L address entries) of the first map data block MDB1. Therefore, the processor 220 may control the nonvolatile memory device 100 to store the P2L address entries for the fourth super block SB4 in the remaining space of the first map data block MDB1.

Hence, the P2L address entries for the first super block SB1, the third super block SB3 and the fourth super block SB4 may be stored in the first map data block MDB1, and the P2L address entries for the second super block SB2 may be stored in the second map data block MDB2.

Although the number (for example, 3) of the super blocks related with the P2L address entries stored in the first map data block MDB1 is larger than the number (for example, 1) of the super blocks related with the P2L address entries stored in the second map data block MDB2, since the numbers of valid data are the same, there is no substantial difference between the cost of garbage collection (GC) for the super blocks related with the P2L address entries stored in the first map data block MDB1 and the cost of garbage collection (GC) for the super block related with the P2L address entries stored in the second map data block MDB2.

Also, since P2L address entries for a plurality of super blocks may be stored in one map data block, it is possible to efficiently use a limited number of map data blocks.

Figure 7:
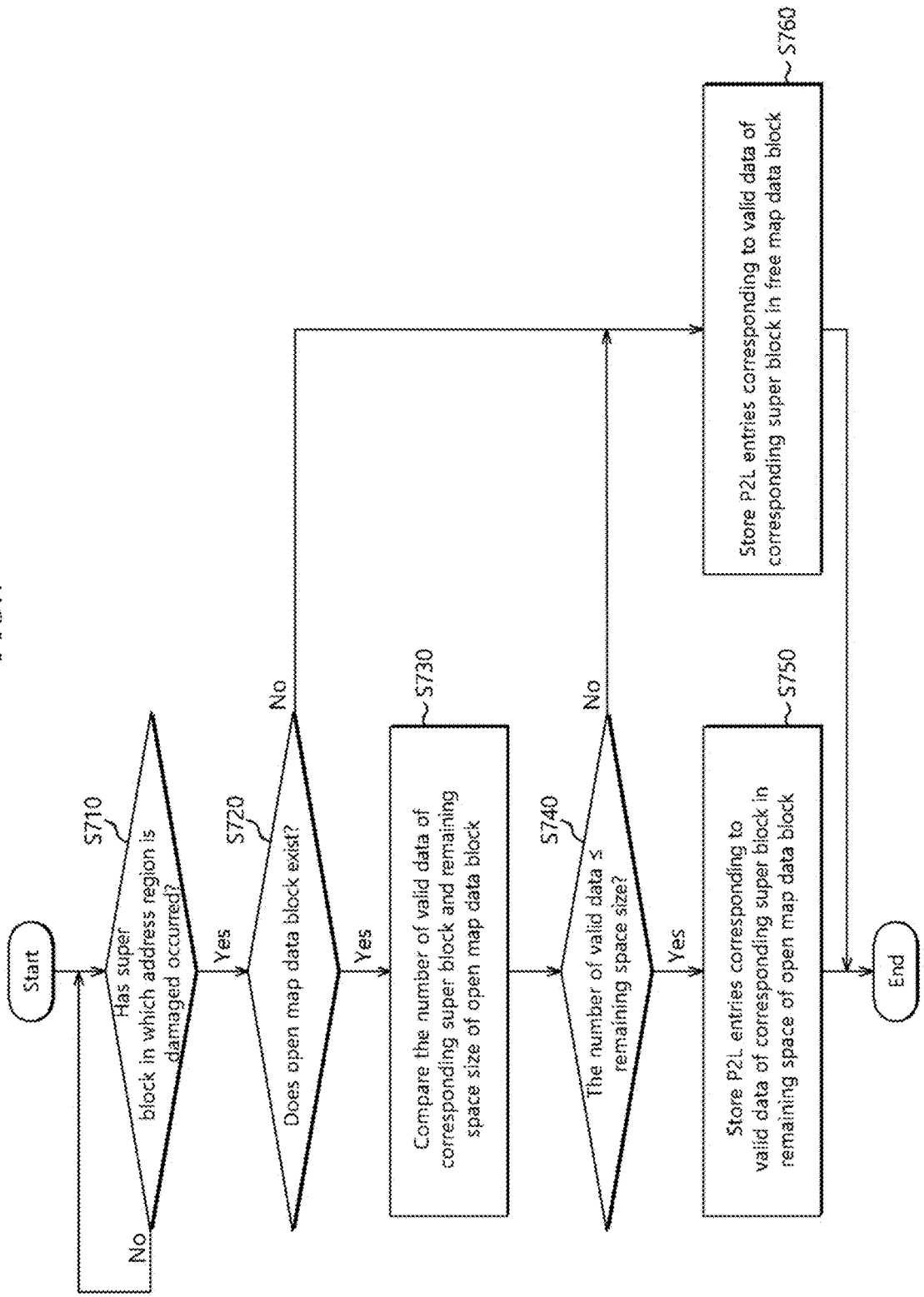
FIG. 7 is a flow chart illustrating an operating method of a data storage device in accordance with an embodiment of the present disclosure.

FIG. 7 is a flow chart illustrating an operating method of the data storage device 10 in accordance with an embodiment of the present disclosure. In explaining the operating method of the data storage device 10 in accordance with the embodiment, with reference to FIG. 7, reference may be made to FIGS. 1 to 6.

At step S710, the processor 220 of the controller 200 may determine whether a super block SB in which an address region AR (see FIG. 4) is damaged occurs. A super block SB in which an address region AR is damaged may occur due to a sudden power-off (SPO) or the like. Since descriptions were made above for a case where a super block SB in which an address region AR is damaged occurs, detailed descriptions therefor will be omitted herein. If a super block SB in which an address region AR is damaged occurs, the process may proceed to step S720.

At the step S720, the processor 220 may determine whether there is an open map data block among the first to i^th map data blocks MDB1 to MDBi (see FIG. 5) allocated in the system area 100A (see FIG. 5) of the nonvolatile memory device 100 (see FIG. 5). An open map data block may mean a map data block which is being used, that is, a map data block in which less than a predetermined number (for example, N number) of P2L address entries are stored. If an open map data block exists, the process may proceed to step S730.

At the step S730, the processor 220 may compare the number of the valid data of the super block SB in which an address region AR is damaged and the available capacity of the open map data block. The number of the valid data of the super block SB may correspond to the number of the P2L address entries stored in the meta-regions MR (see FIG. 4) of the super block SB.

At step S740, the processor 220 may determine whether the number of the valid data of the super block SB is equal to or smaller than the available capacity of the open map data block. If the number of the valid data is equal to or smaller than the available capacity (e.g., size of the remaining space) of the open map data block, the process may proceed to step S750.

At the step S750, the processor 220 may control the nonvolatile memory device 100 to read out the P2L address entries stored in the meta-regions MR of the super block SB in which an address region AR is damaged and store the read-out P2L address entries in the remaining space of the open map data block.

If an open map data block does not exist at the step S720 or the number of the valid data is larger than the available capacity of the open map data block at the step S740, the process may proceed to step S760.

At the step S760, the processor 220 may control the nonvolatile memory device 100 to read out the P2L address entries stored in the meta-regions MR of the super block SB in which an address region AR is damaged and store the read-out P2L address entries in a free map data block. The free map data block used at this step may be selected by the processor 220 among the first to i^th map data blocks MDB1 to MDBi.

Figure 8:
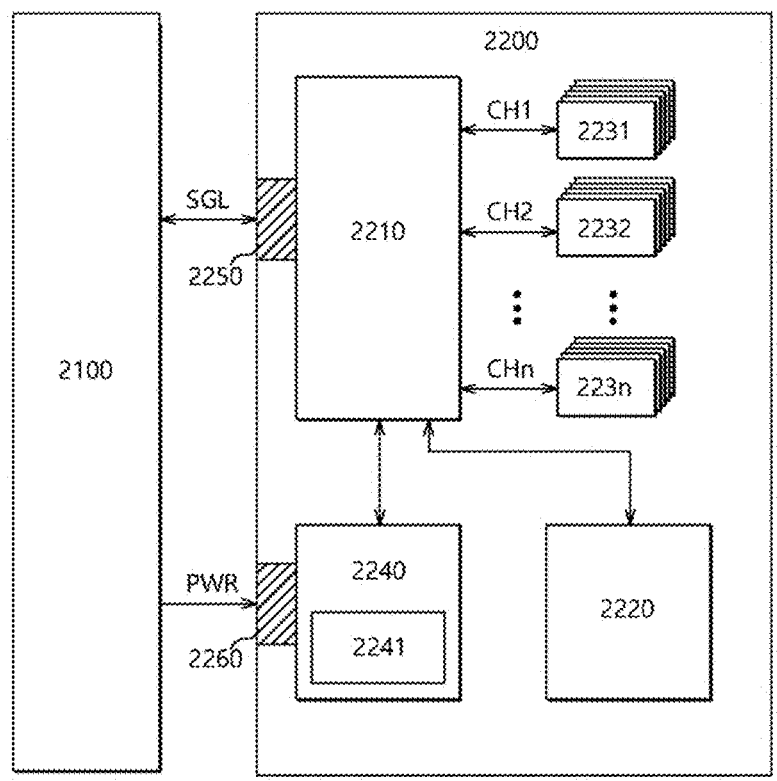
FIG. 8 is a diagram illustrating an example of a data processing system including a solid-state drive (SSD) in accordance with an embodiment of the present disclosure.

FIG. 8 is a diagram illustrating an example of a data processing system including a solid-state drive (SSD) in accordance with an embodiment. Referring to FIG. 8, a data processing system 2000 may include a host apparatus 2100 and an SSD 2200.

The SSD 2200 may include a controller 2210, a buffer memory device 2220, non-volatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 9:
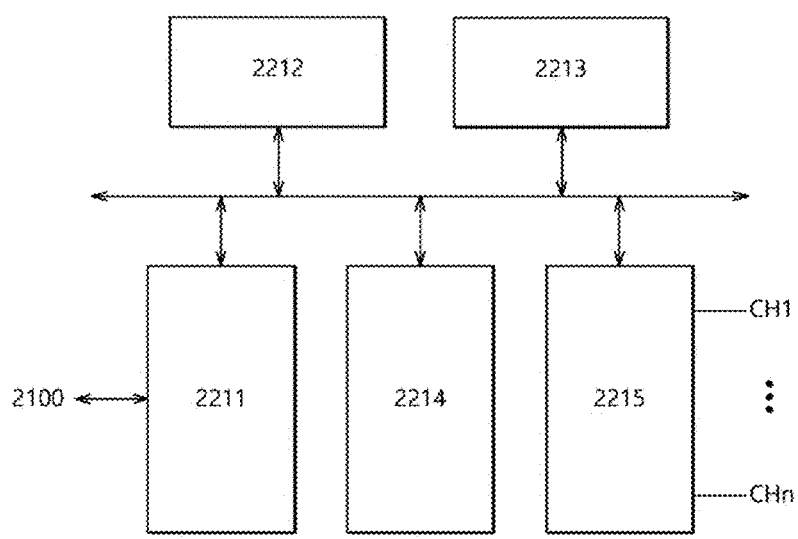
FIG. 9 is a diagram illustrating an example of a controller illustrated in FIG. 8.

FIG. 9 is a diagram illustrating an example of the controller 2210 of FIG. 8. Referring to FIG. 9, the controller 2210 may include a host interface unit 2211, a control unit 2212, a random-access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 10:
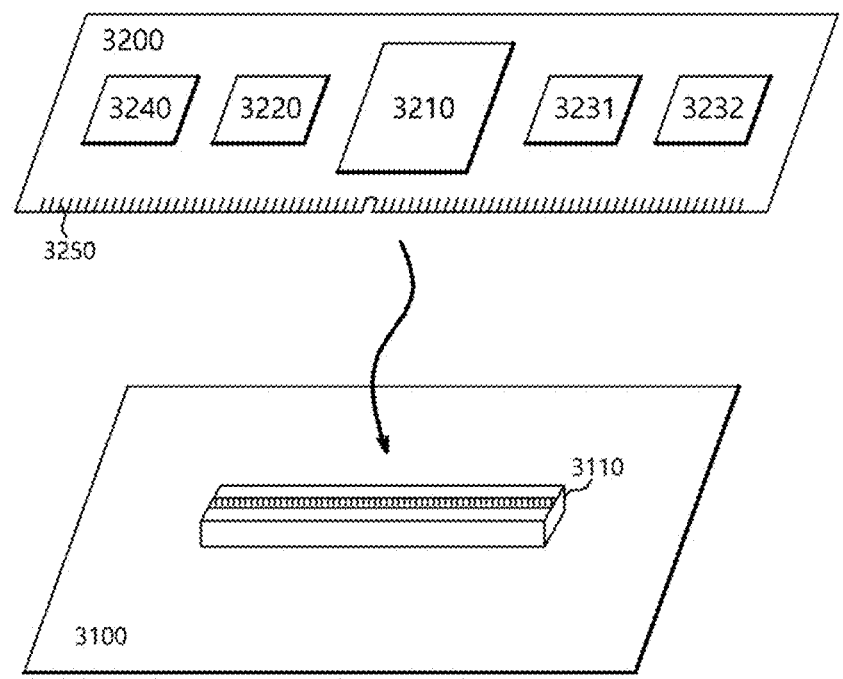
FIG. 10 is a diagram illustrating an example of a data processing system including a data storage apparatus in accordance with an embodiment of the present disclosure.

FIG. 10 is a diagram illustrating an example of a data processing system including a data storage apparatus in accordance with an embodiment. Referring to FIG. 10, a data processing system 3000 may include a host apparatus 3100 and a data storage apparatus 3200.

The host apparatus 3100 may be configured in a board form such as a printed circuit board (PCB). Although not shown in FIG. 10, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 9.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 11:
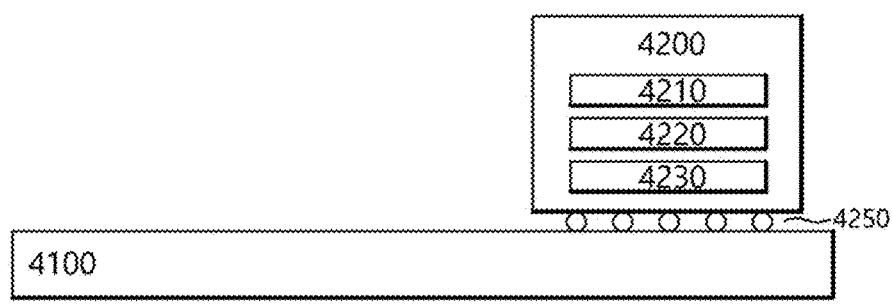
FIG. 11 is a diagram illustrating an example of a data processing system including a data storage apparatus in accordance with an embodiment of the present disclosure.

FIG. 11 is a diagram illustrating an example of a data processing system including a data storage apparatus in accordance with an embodiment. Referring to FIG. 11, a data processing system 4000 may include a host apparatus 4100 and a data storage apparatus 4200.

The host apparatus 4100 may be configured in a board form such as a PCB. Although not shown in FIG. 11, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 9.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 12:
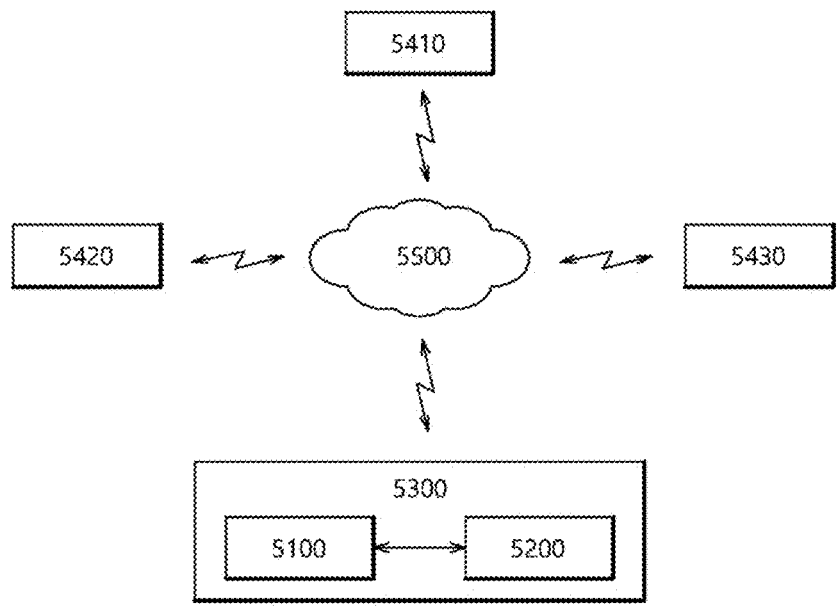
FIG. 12 is a diagram illustrating an example of a network system including a data storage apparatus in accordance with an embodiment of the present disclosure.

FIG. 12 is a diagram illustrating an example of a network system 5000 including a data storage apparatus in accordance with an embodiment. Referring to FIG. 12, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10 of FIG. 1, the data storage apparatus 2200 of FIG. 8, the data storage apparatus 3200 of FIG. 10, or the data storage apparatus 4200 of FIG. 11.

Figure 13:
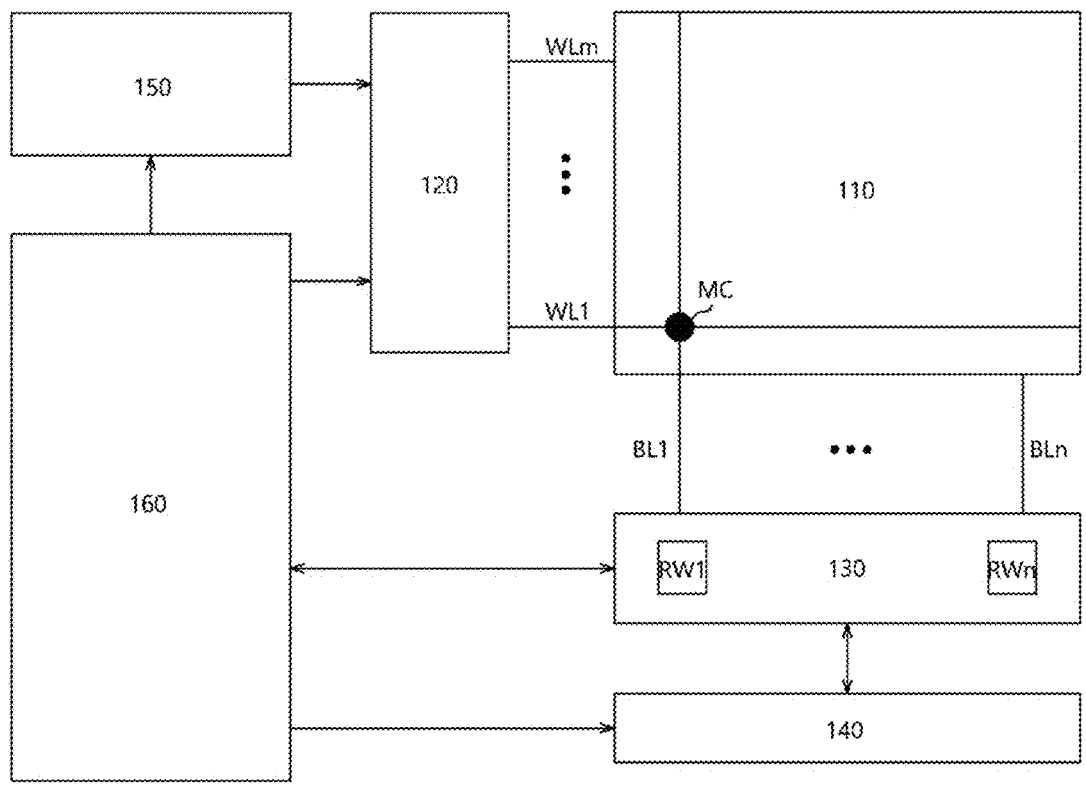
FIG. 13 is a block diagram illustrating an example of a nonvolatile memory device included in a data storage apparatus in accordance with an embodiment of the present disclosure.

FIG. 13 is a block diagram illustrating an example of a nonvolatile memory device included in a data storage apparatus in accordance with an embodiment. Referring to FIG. 13, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through row lines including word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage device comprising:
a nonvolatile memory device including a user area having a plurality of memory block groups and a system area having a plurality of map data blocks; and
a controller configured to control an operation of the nonvolatile memory device,
wherein each of the plurality of memory block groups includes a first page group including a plurality of first pages and a second page group including a plurality of second pages,
wherein each of the plurality of first pages stores data received from a host device and a physical-to-logical (P2L) address entry corresponding to the data, and the plurality of second pages store one or more P2L address entries corresponding to valid data in the first page group,
wherein, when the second page group of a first memory block group is damaged, the controller determines whether a sum of sizes of one or more P2L address entries corresponding to valid data stored in the first page group of the first memory block group is equal to or less than an available capacity of an open map data block among the plurality of map data blocks, and stores the one or more P2L address entries within the first page group of the first memory block group, in the open map data block based on the determination result.

2. The data storage device according to claim 1, wherein each of the plurality of map data blocks stores a predetermined number of P2L address entries.

3. The data storage device according to claim 1, wherein the controller checks whether the open map data block exists among the plurality of map data blocks, selects one among the plurality of map data blocks when the open map data block does not exist, and stores the one or more P2L address entries within the first page group of the first memory block group in the selected map data block.

4. The data storage device according to claim 1, wherein, when the sum of the sizes of the one or more P2L entries within the first page group of the first memory block group exceeds the available capacity of the open map data block, the controller selects a map data block other than the open map data block among the plurality of map data blocks, and stores the one or more P2L entries within the first page group of the first memory block group in the selected map data block.

5. The data storage device according to claim 1, wherein the each of the plurality of first pages include a user region in which the data received from the host device is stored and a meta-region in which meta information for the data is stored.

6. The data storage device according to claim 5, wherein the meta information includes a P2L address entry corresponding to the data stored in a corresponding user region.

7. The data storage device according to claim 6, wherein, when programming for the first page group of each memory block group is completed, the controller controls the nonvolatile memory device to read out P2L address entries stored in the meta-region of the first page group and store the read-out P2L address entries in the corresponding second page group.

8. A method for operating a data storage device including a nonvolatile memory device, including a plurality of memory block groups each having a first page group storing data received from a host device and a physical-to-logical (P2L) address entry corresponding the data and a second page group storing address mapping information corresponding to valid data stored in the first page group and a plurality of map data blocks, and a controller for controlling the nonvolatile memory device, the method comprising:

comparing, by the controller, when the second page group of a first memory block group is damaged, a sum of sizes of one or more P2L address entries corresponding to valid data stored in the first page group of the first memory block group and available capacity of an open map data block among the plurality of map data blocks; and storing, by the controller, when the sum of the sizes of the one or more P2L address entries corresponding to the valid data stored in the first page group of the first memory block group is equal to or less than the available capacity of the open map data block, the one or more P2L address entries stored in the first page group of the first memory block group, in the open map data block.

9. The method according to claim 8, further comprising, before the comparing of the sum of the sizes of the one or more P2L address entries corresponding to the valid data stored in the first page group of the first memory block group and the available capacity of the open map data block, checking, by the controller, whether the open map data block exists among the plurality of map data blocks.

10. The method according to claim 9, further comprising, when the open map data block does not exist, selecting, by the controller, a map data block among the plurality of map data blocks; and storing, by the controller, the one or more P2L address entries corresponding to the valid data stored in the first page group of the first memory block group in the selected map data block.

11. The method according to claim 8, further comprising, when the sum of the sizes of the one or more P2L address entries corresponding to the valid data stored in the first page groups of the first memory block group exceeds the available capacity of the open map data block, selecting, by the controller, a map data block other than the open map data block among the plurality of map data blocks; and storing, by the controller, the one or more P2L address entries corresponding to the valid data stored in the first page group of the first memory block group in the selected map data block.

12. The method according to claim 8, wherein each of the plurality of map data blocks stores a predetermined number of P2L entries.

13. The method according to claim 8, wherein the first page group of each memory block group includes a plurality of first pages, and wherein each of the plurality of first pages include a user region in which the data received from the host device is stored and a meta-region in which meta information for the data is stored.

14. The method according to claim 13, wherein, the meta information includes a P2L address entry corresponding to the data stored in a corresponding user region.

15. The method according to claim 14, further comprising, when programming for the first page group of each memory block group is completed, reading out, by the controller, one or more P2L address entries stored in the meta-region; and storing, by the controller, the read-out one or more P2L entries in the second page group as the address mapping information.

16. A data storage device comprising:

a memory device including a first memory block storing data received from a host device, and a second and a third memory blocks storing address mapping information; and a controller configured to control the memory device, wherein the first memory block includes a first page group storing the data and physical-to-logical (P2L) address entries corresponding to the data and a second page group storing one or more P2L address entries corresponding to valid data within the first page group, and wherein the controller, when the second page group of the first memory block is damaged, moves the one or more (P2L) address entries corresponding to the valid data within the first page group of the first memory block into the second memory block when the second memory block has available capacity equal to or greater than a sum of sizes of the one or more P2L address entries within the first page group of the first memory block, and into the third memory block when the second memory block has available capacity less than the size of the one or more P2L address entries within the first page group of the first memory block.

* * * * *